United States Patent [19]
Hugron

[11] Patent Number: 5,214,886
[45] Date of Patent: Jun. 1, 1993

[54] BREAKAWAY CONNECTION FOR POST

[76] Inventor: Denis P. Hugron, 1855, Georges, St-Hubert, Quebec, J4T 1W2

[21] Appl. No.: 897,825

[22] Filed: Jun. 12, 1992

[51] Int. Cl.$^5$ .............................................. E04B 1/00
[52] U.S. Cl. ...................................... 52/98; 248/548; 248/900; 403/2
[58] Field of Search ............... 248/548, 900, 909; 403/2; 116/63 R; 40/607, 608; 52/98

[56] References Cited

U.S. PATENT DOCUMENTS

| | | | |
|---|---|---|---|
| 3,539,138 | 11/1970 | Desroches | 248/909 X |
| 3,820,906 | 6/1974 | Katt | 403/2 |
| 3,912,405 | 10/1975 | Katt | 403/2 |
| 4,126,403 | 11/1978 | Sweeney | 403/2 |
| 4,435,930 | 3/1984 | Plym | 52/98 |
| 4,490,062 | 12/1984 | Chisholm | 52/98 X |
| 4,858,876 | 8/1989 | Moreno | |
| 4,928,446 | 5/1990 | Alexander | 52/98 |
| 5,125,194 | 6/1992 | Granger | 52/98 |

FOREIGN PATENT DOCUMENTS

| | | |
|---|---|---|
| 1000122 | 11/1976 | Canada . |
| 1090981 | 12/1980 | Canada . |
| 406221 | 2/1934 | United Kingdom ............ 248/548 |

Primary Examiner—J. Franklin Foss
Attorney, Agent, or Firm—Roland L. Morneau

[57] ABSTRACT

A breakaway connection is mounted between a lower and an upper post section for upstandingly supporting the upper section on the lower section. The breakaway connection has a U-shape cross-section with lateral flanges. A weakened linear section extends horizontally on the flanges and partly on the U-shaped portion and is adapted to break upon a lateral impact. The linear section extending downwardly into folds between the flanges and the U-shaped portion of the connection for allowing the upper part of the connection to tilt backwardly while both the upper and lower parts of the connection remain linked together.

7 Claims, 2 Drawing Sheets

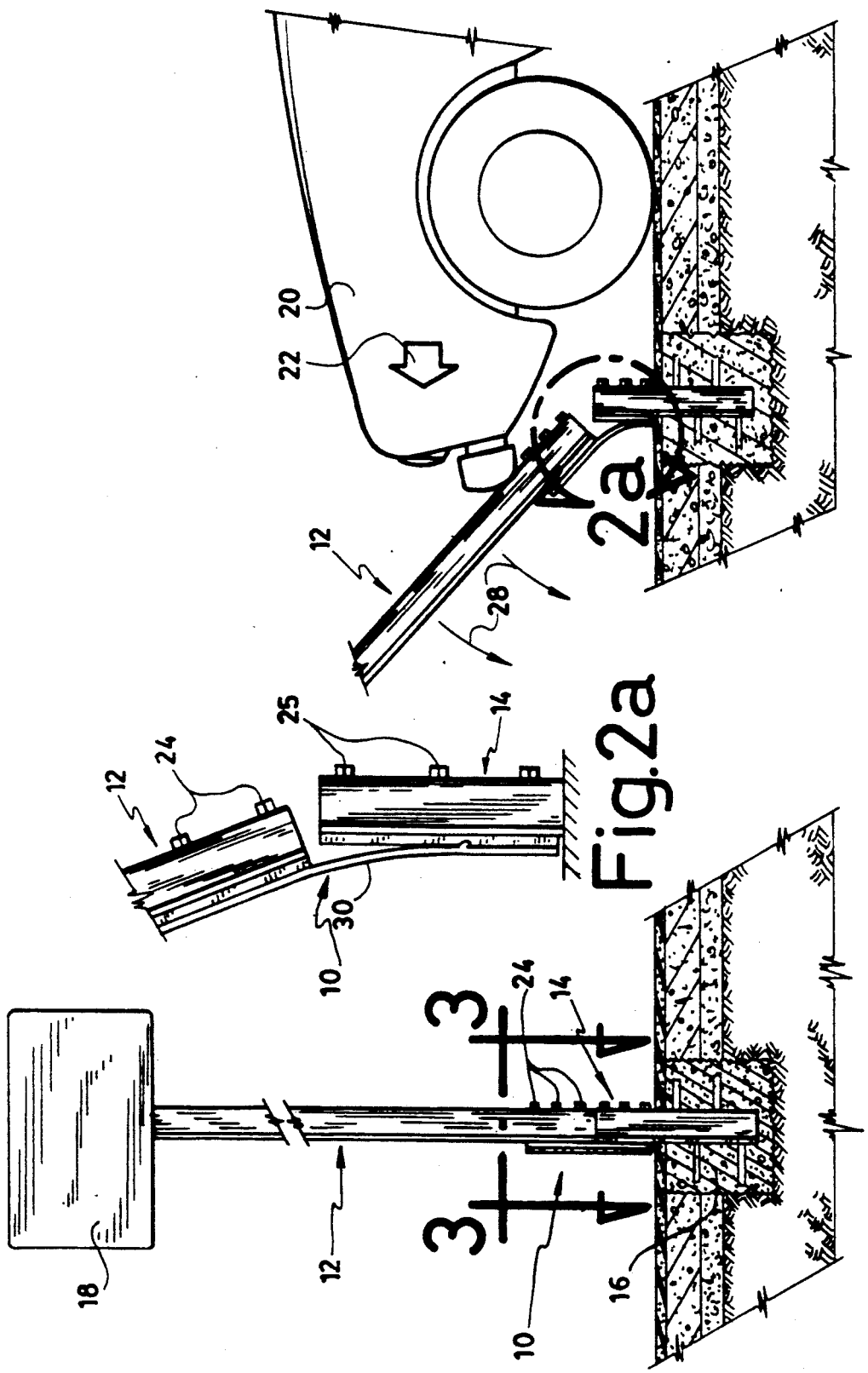

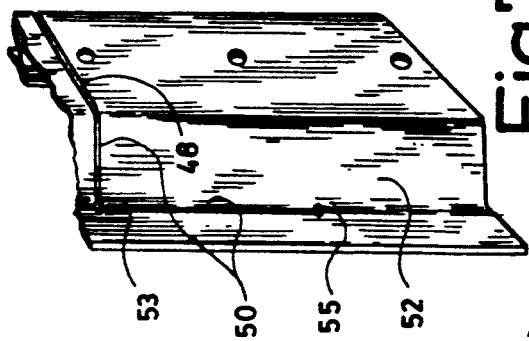
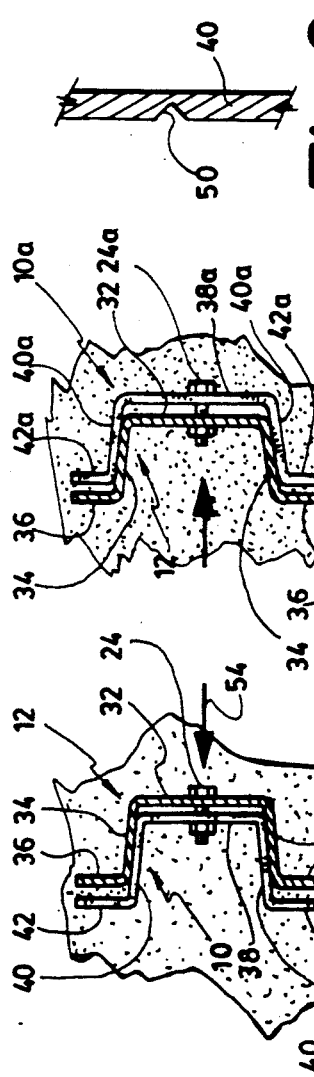
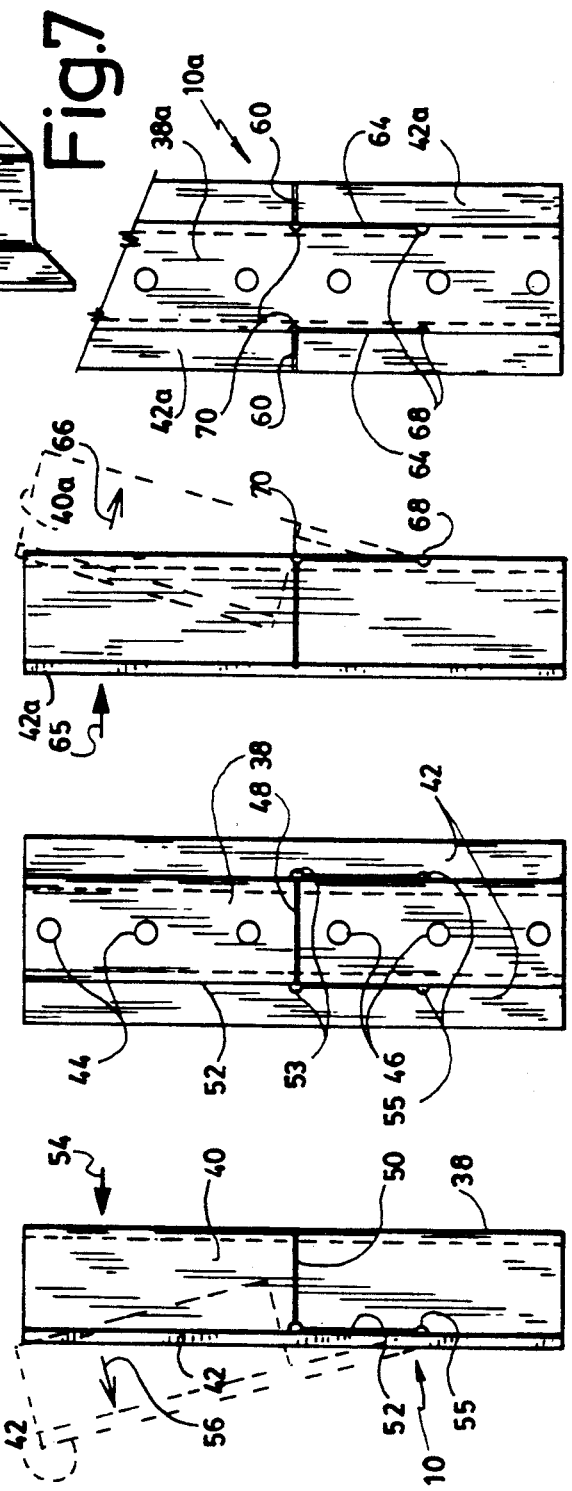

BREAKAWAY CONNECTION FOR POST

BACKGROUND OF THE INVENTION

The present invention is directed to street and highway posts generally used to support a signboard and more specifically to a connection adapted to be mounted between a lower post section and an upper post section. The connection is particularly adapted to prevent damage to the lower post section when the post is hit by a vehichle, and in many instances to also prevent damages to the upper post section.

The invention is particularly directed to a specific type of connection having a corrugated cross-section and more specifically, to a U-shape channel having two lateral flanges extending outwardly from the U-shaped channel. The connection is provided with a weakened linear section extending partly through the cross-section of the channel so as to allow the tilting of the upper post section relative to the lower post section and a subsequent tearing apart of the connection to maintain the upper post section linked to the lower post section.

PRIOR ART

A search of the prior art has revealed three related patents. U.S. Pat. No. 4,858,876 issued on Aug. 22, 1989, is directed to a breakaway connection between a lower and an upper post section which makes use of a shear pin for maintaining both sections together and a cable for maintaining the link between both sections after the shear pin has been broken.

In Canadian patent No. 1,000,122, the lower and upper post sections are connected with a pair of clamp members, one of which has a transverse zone of reduced cross-section to initiate the severance of both the upper and lower post sections upon impact. The link between both the upper and lower sections is maintained by a bolt fixed between the clamp member and the lower post section.

Canadian patent No. 1,090,981 issued on Dec. 9, 1980 similarly describes a post construction including an upper and a lower section which are held together by a flat retainer bar bolted between overlapping portions of the upper and the lower post sections. The retainer bar is intended to maintain the link between the upper and the lower section after the post has been hit.

In the three above mentioned patents, it is pointed out that the upper and the lower post sections are made of channels having substantially the same cross-sections. This is the type of channels which is commonly used for highway and street signposts. The three patents make use of hardward which must be built especially for the purpose described. This hardware is generally quite distinct from the construction of the post itself and in some cases requires the casting of parts.

It is one of the objects of the present invention to make use of a connection between the upper and the lower sections which has exactly the same cross-section as both the upper and the lower sections. The novel connection is specifically provided with a weakened linear section so as to provide a zone of weakness which initiates the breaking of the connection and which further allows the tearing of the connection while maintaining a link between both ends thereof.

SUMMARY OF THE INVENTION

The invention is directed to a breakaway connection for posts formed of a U-shaped iron channel having a web face, two side walls extending on each side of the web face at an angle slightly exceeding 90 degrees and a lateral flange extending outwardly from each of the side walls in a co-planner direction. In one embodiment, the connection has a weakened linear section extending horizontally and continuously across the web face and the side walls and downwardly in fold lines between the flanges and the side walls. In another embodiment, the connection has a weakened linear section extending horizontally across both lateral flanges and the side walls and downwardly into fold lines between the web face and each of the side walls. Considering that the weakened linear section defines a boundary between an upper and a lower part of the connection, an impact upon the upper part of the connection will cause the connection to tear along the horizontal portion of the linear section and tilt backwardly while both the upward and lower parts of the connection remain linked to each other.

Although the invention especially applies to a post formed of a channel having only one U-shaped channel, the same invention applies to a post or a fence having a corrugated shaped formed of alternating right-angular grooves and ridges wherein the weakened linear section are provided in similar manners as when the post has only one U-shaped cross-section with lateral flanges.

The weakened linear section is preferably contemplated as a groove provided in the material of the connection which is usually iron.

BRIEF DESCRIPTION OF THE DRAWINGS

FIG. 1 is a side view of a post having a lower and an upper section held together by a breakaway connection according to the invention, FIG. 2 is a side view of a post supported by a breakaway connection being hit by a vehicle, FIG. 2a is an enlarged view of encircled portion 2a of FIG. 2, FIG. 3 is a cross-sectional view taken along line 3—3 of FIG. 1, FIG. 3a is a cross-sectional view similar to FIG. 3 for an alternative embodiment of the invention, FIGS. 4 and 5 are respectively side and front views of the first embodiment of the invention, FIGS. 4a and 5a are respectively side and front views of the alternative embodiment of the invention, FIG. 6 is a cross-sectional view illustrating the weakened linear section of the breakaway connection to the invention, and FIG. 7 is a perspective view of a portion of the breakaway connection illustrating a weakened linear connection according to the first embodiment of the invention.

DETAILED DESCRIPTION OF THE INVENTION

FIG. 1 illustrates a breakaway connection 10 according to the invention holding an upper post section 12 superposed on a lower post section 14. The lower post section 14 is secured in the ground and embedded in cement 16 so as to be permenantly used even after the upper section 12 has been hit by a vehicle. FIG. 1 also illustrates a signboard 18 at the top of the upper post section 12. The signboard 18 is illustrated facing frontwardly to properly identify its meaning but in practice, this signboard should be seen sideways facing the left hand side of the upper post 12.

FIGS. 2 and 2a show the resulting shape of the breakaway connection 10 after it has been hit by a car 20 in the direction of the arrow 22. The breakaway connection 10 is held to the upper post section 12 by bolts 24 and to the lower post section 14 by bolts 26. Upon impact, the upper post section 12 tilts in the direction of the arrow 28, while both the upper and lower post sections 12 and 14 remain linked to each other by a central strip on the web face 38 which tears along predetermined lines defined by weakened linear sections as seen later.

The upper and lower post sections 12 and 14 have corresponding cross-sectional configuration which is illustrated in FIGS. 3 and 3a. It includes a web face 32, two side walls 34 which are extending on each side of the web face 32 at an angle slightly exceeding 90 degrees. Two lateral flanges 36 extend outwardly from each side wall 34 in a coplanner direction. The breakaway connection 10 has a similar U-shape configuration as the upper and the lower post sections 12 and 14 and is provided with a web face 38, side walls 40 and flanges 42. The breakaway connection 10 extends partly inside the U-shape channel 12 and 14 and is secured to each of them by few bolts 24 and 26 extending through the web faces 32 and 38. The bolts 24 and 26 extends through holes 44 and 46 which are generally provided in the web faces 32 and 38.

The breakaway connection as particularly illustrated in FIGS. 4 and 5 is provided with a recessed linear section having a horizontal portion 48 along the web face 38, a horizontal section 50 along the side walls 40 and vertical recessed linear sections 52 which are in the folds between the flanges 42 and the sidewalls 40. The weakened linear sections 48, 50 and 52 are generally constituted of a groove extending through the material of the breakaway connection. The breakaway connection is generally made of galvanized iron and the groove extends in the material at about ½ to ⅔ the thickness of the iron.

The breakaway connection is fixed to the upper and lower sections 12 and 14 so that the grooves 48 and 50 are aligned with the intersections of both the upper and lower post sections 12 and 14. When the upper post section 12 is hit by a car such as 20 in the direction of arrow 54, the grooves 48 and 50 will allow the breakaway connection to open up along the grooves 48 and 50 and tilt in the direction of the arrow 56. When the impact remains on the upper post section with a follow through, the vertical groove 52 will open up until it reaches the bottom of the grooves 52, that is, the holes 55 at which point the material of the connection will provide a strong resistance to tearing. The length of the groove 52 is usually chosen so as to correspond a tilting of the upper post section 12 corresponding to its abutment with the adjacent ground.

This first embodiment as shown in FIGS. 3, 4 and 5 is contemplated for an impact coming in the direction of the arrow 54 and for this purpose, the breakaway connection is mounted inside the U-shaped channels 12 and 14 with the configuration of the recessed linear sections 48, 50 and 52 extending horizontally through the web face 38, the sidewalls 40 and vertically down the folds between the lateral flanges 42 and the sidewalls 40.

The embodiment illustrated in FIGS. 3, 4 and 5 is directed to the breakaway connection being hit on the web face side 38. However, the same invention applies when the breakaway connection is expected to be preponderantly hit on the flange side 36 as shown in FIGS. 3a, 4a and 5a. For this purpose, the breakaway connection 12a is straddeling the U-shape channel of the upper and lower post sections as particularly shown in FIG. 3a. For this purpose, the weakened linear section is characterized by a recessed linear section 60 extending on the flanges 42a and by recessed linear sections 62 extending on the side walls 40a and by a recessed linear section 64 extending downwardly in the folds between the web face 38a and the side walls 42a. With this second embodiment, when the breakaway connection 10a which is fixed to a lower and upper post section in the manner shown in FIG. 3a, the portion of the connection 10a above the horizontal recessed linear sections 60 and 62 will start to tilt in the direction of the arrow 66 and the portion of the web face 38a between the two recessed sections 64 will be torn away from the sidewalls 40a until they reach their lower end provided with small holes 68. If the impact in the direction of the arrow 65 persists, the part of the connection 10a which is secured to the lower post section 14 by the bolts and nuts 24a will strongly resist further tearing apart of the connection. The length of the vertical recessed sections 64 may be contemplated to allow the upper post section 12 to lean until the top end touches the ground while still being linked to the lower post section 14 by the breakaway connection 10. In this second embodiment, the recessed sections 60 and 62 are essentially horizontal while recess section 64 is essentially vertical. In order to provide a continuity between the tearing apart of the horizontal recessed sections 62 with 64, a small hole 70 is provided at each intersection. This is similarly true for the first embodiment illustrated in FIGS. 3-5 wherein small holes 53 are located at the intersection of the recessed sections 52 and 48. The holes 55 and 68 are intended to stop the tearing along the web faces 38 and 38a respectively.

The depth of the recess sections such as 50 shown in FIG. 6, may substantially vary depending on the height of the signalling post, and the type of impact expected. A breakaway connection intended for signalling post on a bicycle pathway requires a deeper recess such as 50 compared to a breakaway connection intended for signalling post installed on highways where fast travelling vehicles are passing by.

Although the present invention has been described for a signalling post having only one U-shaped channel provided with a pair of lateral flanges, the same invention applies to a larger surface such as a panel or a fence having a corrugated configuration. For such purpose, the breakaway connection extends over a plurality of adjacent U-shaped channels which consist of alternating grooves and ridges which have substantially right angular folds. The recess sections which needs to be provided on such fences are similar to the ones explained for a single U-shape channel. The weakened linear section extends horizontally around the ridges and downwardly in the fold lines between each side of the grooves at the bottom of the ridges.

I claim:

1. A breakaway connection adapted to be overlapping fixed on a post formed of superposed and separated upper and lower sections defining a boundary line therebetween, said sections having a generally cross-sectional U-shaped configuration formed by a web face, two sidewalls extending on each side of said web face at an angle slightly exceeding 90 degrees, and a lateral flange extending outwardly from each one of said sidewalls in a co-planner direction, said connection formed exclusively of an iron channel stub having a cross-sectional configuration similar to the post, said stub having a continuous weakened linear section extending horizontally across the web face and said sidewalls and downwardly in fold lines between said flanges and said sidewalls, said linear section across said web face adapted to be located at a level corresponding to said boundary line, whereby, when said connection is impacted upon said web face above said weakened linear section, the connection is adapted to tear continuously along said linear section and tilt backwardly while both the upper and lower sections remain linked to each other by said flanges.

2. A breakaway connection adapted to be overlapping fixed on a post formed of superposed and separated upper and lower sections defining a boundary line, said sections having a generally cross-sectional U-shaped configuration formed by a web face, two sidewalls extending on each side of said web face at an angle slightly exceeding 90 degrees, and a lateral flange extending outwardly from each one of said sidewalls in a co-planner direction, said connection formed exclusively of an iron channel stub having a cross-sectional configuration similar to the post, said stub having a continuous weakened linear section extending horizontally across both lateral flanges and sidewalls and downwardly in fold lines between said web face and each of the sidewalls, said linear section across said flanges adapted to be located at a level corresponding to said boundary line, whereby, when said connection is impacted upon said flanges above said weakened linear section, the connection is adapted to continuously tear along said linear section and tilt backwardly while both the upper and the lower sections remain linked to each other by said web face.

3. A breakaway connection as recited in claim 2, wherein the web face of the connection is provided with holes above and below said boundary line, said holes adapted to allow the passage of bolts for retaining said connection to said upper and lower sections.

4. A breakaway connection as recited in claim 2, wherein the weakened line section is a groove.

5. A breakaway connection as recited in claim 4, wherein the groove is about two thirds to one half the thickness of the iron.

6. A breakaway connection as recited in claim 1 and 2, wherein a hole is provided at the intersection of the horizontal and the downward weakened linear sections.

7. A post having a lower section adapted to be secured in the ground and an upper section separately superposed above and extending from said lower section, a breakaway connection formed exclusively of an iron channel stub having a cross-sectional configuration similar to said lower and upper section, said connection having a generally U-shaped configuration formed by a web face, two sidewalls extending on each side of said web face at an angle slightly exceeding 90 degrees, and a lateral flange exceeding outwardly from each one of said sidewalls in a coplanar direction said connection having a continuous weakened linear section extending horizontally across the web face and said sidewalls and downwardly in fold lines between said flanges and said sidewalls, said linear section across said web face defining a boundary line at a level between the upper and the lower section, means for securing the web faces of said connection and of said upper and lower sections in an overlapping arrangement, whereby, when said upper section is impacted above said boundary line, the connection is adapted to tear along said linear section and tilt backwardly while both the upper and lower sections remain linked to each other by said flanges.

* * * * *